United States Patent
Jepsen

(10) Patent No.: US 9,607,582 B2
(45) Date of Patent: Mar. 28, 2017

(54) DYNAMIC UPDATE OF DISPLAY PIXELS

(71) Applicant: Google Inc., Mountain View, CA (US)

(72) Inventor: Mary Lou Jepsen, Sausalito, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/202,251

(22) Filed: Jul. 5, 2016

(65) Prior Publication Data

US 2016/0314765 A1    Oct. 27, 2016

Related U.S. Application Data

(63) Continuation of application No. 14/032,644, filed on Sep. 20, 2013, now Pat. No. 9,401,128.

(51) Int. Cl.
| | |
|---|---|
| *G09G 5/18* | (2006.01) |
| *G09G 5/14* | (2006.01) |
| *G06F 3/14* | (2006.01) |
| *G06F 3/00* | (2006.01) |

(52) U.S. Cl.
CPC .................. *G09G 5/18* (2013.01); *G06F 3/00* (2013.01); *G06F 3/1446* (2013.01); *G09G 5/14* (2013.01); *G09G 2300/026* (2013.01); *G09G 2310/0202* (2013.01); *G09G 2310/04* (2013.01); *G09G 2320/0261* (2013.01); *G09G 2340/0435* (2013.01); *G09G 2350/00* (2013.01)

(58) Field of Classification Search
CPC .................................. G09G 5/18; G09G 5/14
See application file for complete search history.

(56) References Cited

U.S. PATENT DOCUMENTS

| | | |
|---|---|---|
| 6,028,608 A | 2/2000 | Jenkins |
| 6,222,589 B1 | 4/2001 | Faroudja |
| 6,985,158 B2 | 1/2006 | Miller et al. |
| 7,404,645 B2 | 7/2008 | Margulis |
| 7,808,512 B1 | 10/2010 | Hutchins et al. |
| 8,405,770 B2 | 3/2013 | White et al. |
| 2006/0256033 A1 | 11/2006 | Chan et al. |
| 2006/0256039 A1 | 11/2006 | Hagood et al. |
| 2013/0002813 A1 | 1/2013 | Vaught et al. |

*Primary Examiner* — Shaheda Abdin
(74) *Attorney, Agent, or Firm* — Blakely Sokoloff Taylor & Zafman LLP

(57) ABSTRACT

A system and method of driving images on displays includes receiving image content in a processing unit. When a peak data condition is identified, pixel rows of at least one display are updated in a non-sequential order in response to identifying the peak data condition.

4 Claims, 5 Drawing Sheets

DYNAMIC UPDATE OF DISPLAY PIXELS

CROSS-REFERENCE TO RELATED APPLICATION

The present patent application is a continuation of U.S. application Ser. No. 14/032,644, filed on Sep. 20, 2013, the contents of which are hereby incorporated by reference.

TECHNICAL FIELD

This disclosure relates generally to updating display pixels. In particular but not exclusively, this disclosure relates to updating display pixels in a multi-panel display.

BACKGROUND INFORMATION

Large displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

FIG. 1 shows a block diagram illustration of a conventional multi-panel display system 100 that includes display panels 101A-D arranged as multi-panel display 150. The four smaller display panels 101A-D may be conventional flat panel televisions or monitors. The individual images displayed by each display panels 101A-D may constitute a sub-portion of the larger overall-image collectively displayed by multi-panel display 150. Each display panel includes a timing controller ("TCON") 109 coupled to receive image content from CPU/GPU 103 and coupled to control driver 111 to drive pixel region 115. CPU/GPU 103 reads media 102 and prepares the image content in media 102 to be displayed on multi-panel display 150. Media 102 may be an optical disc or be streaming content received from a remote server.

Tiling smaller display panels 101 to form a multi-panel display can come with additional challenges. When the smaller display panels 101 are high-resolution, the multi-panel display 150 displays a very large overall-image that is even higher resolution (e.g. 5-100 megapixels or more). Updating the high resolution overall-image(s) at a given refresh rate (e.g. 30 frames per second) on multi-panel display 150 can create processing throughput issues for CPU/GPU 103, TCONs 109, and drivers 111 that drive the pixel regions 115 because the hardware uses the conventional raster scanning that updates the entire complement of pixels on multi-panel display 150.

Building hardware to drive higher resolution images at video frame rates onto multi-panel display 150 using raster scanning would likely require power hungry processing hardware that would be relatively expensive. Therefore, when a peak data condition occurs in the driving hardware while processing the image content (e.g. during a scene change), a conventional approach is to reduce the frame rate to allow the driving hardware to catch up. However, the conventional approaches to dealing with a peak data condition are often noticed by viewers of multi-panel display 150 as they see image artifacts in the overall-image displayed by multi-panel display 150. One example of an image artifact that may be seen by viewers during a peak data condition is known as "image shearing," as the timing or rendering between display panels 101 is out of sync.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for driving display panels are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
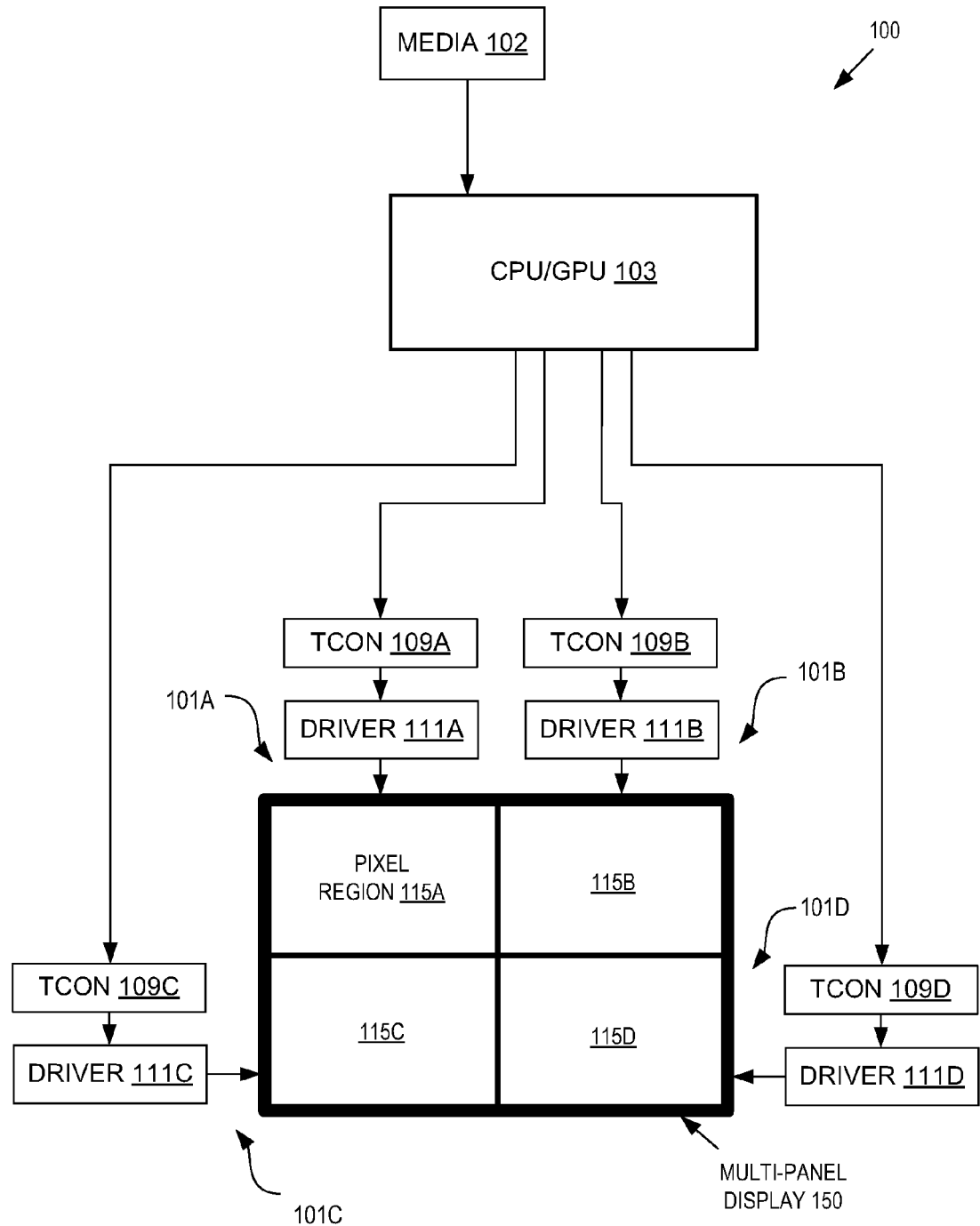
FIG. 1 shows a block diagram illustration of a conventional multi-panel display system that includes display panels arranged as a multi-panel display.
Figure 2:
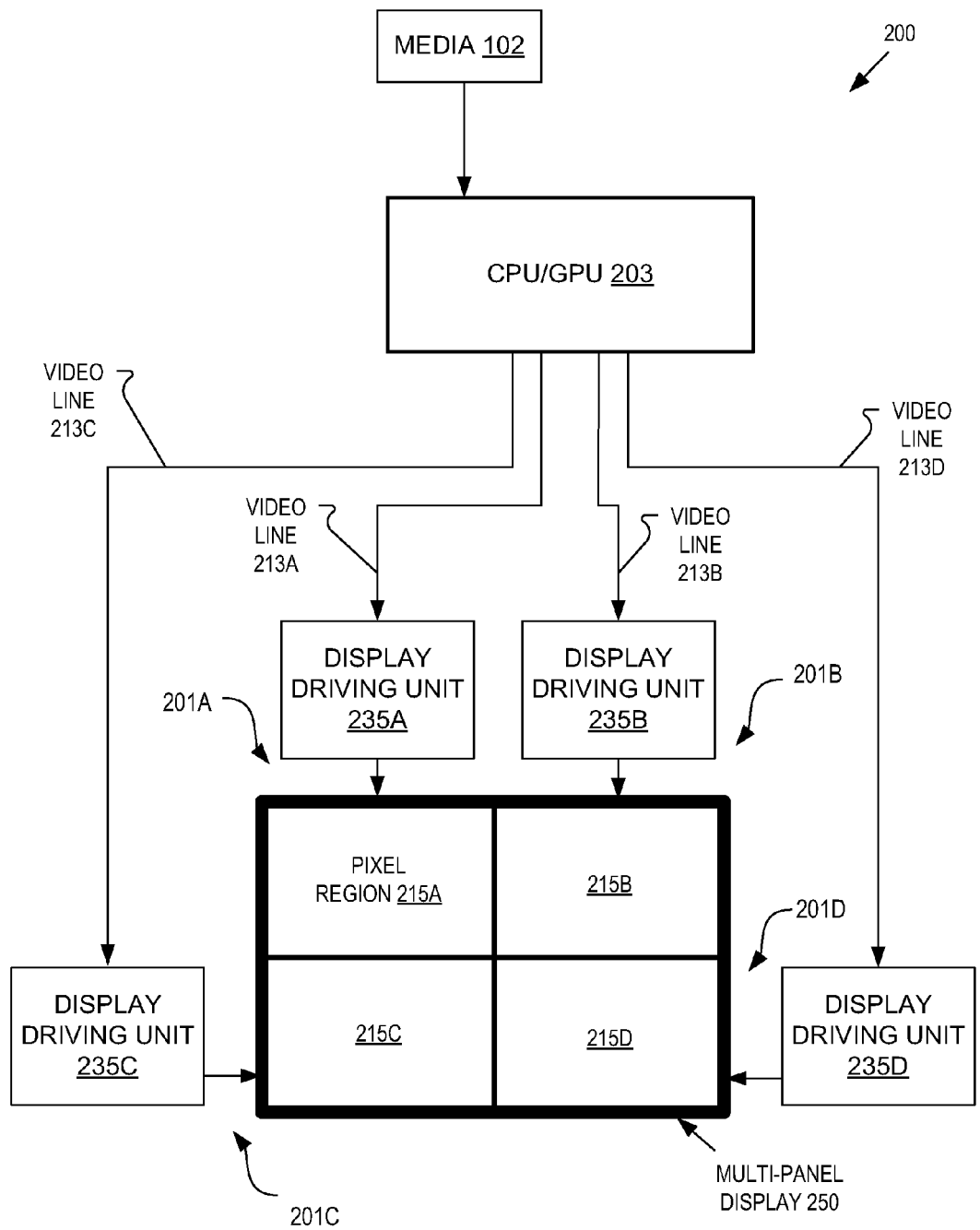
FIG. 2 shows a block diagram illustration of a multi-panel display system that includes a multi-panel display that includes display panels with a display driving unit, in accordance with an embodiment of the disclosure.

FIG. 2 shows a block diagram illustration of a multi-panel display system 200 that includes a multi-panel display 250 including display panels 201A-D with display driving units 235A-D, in accordance with an embodiment of the disclosure. In FIG. 2, display panels 201 are arranged so that the individual images displayed by each display panels 201A-D may constitute a sub-portion of the larger overall-image collectively displayed by multi-panel display 250. Each display panel 201 includes a corresponding display driving unit 235 coupled to receive image content via a video line 213 from CPU/GPU 203. Each display driving unit 235A-D is coupled to drive its corresponding pixel region 215A-D. For example, display panel 201A includes display driving unit 235A and pixel region 215A, while display panel 201B includes display driving unit 235B and pixel region 215B. Pixel regions 215 may be part of a liquid-crystal-display ("LCD") having its pixels arranged in rows and columns. Of course, other display technologies may be utilized.

CPU/GPU 203 reads image media 102 and prepares the image content in media 102 to be displayed on multi-panel display 250. CPU/GPU 203 may include a processor, a Field Programmable Gate Array ("FPGA") or other logic. CPU/GPU 203 may also include a memory to store instructions and data.

Figure 3:
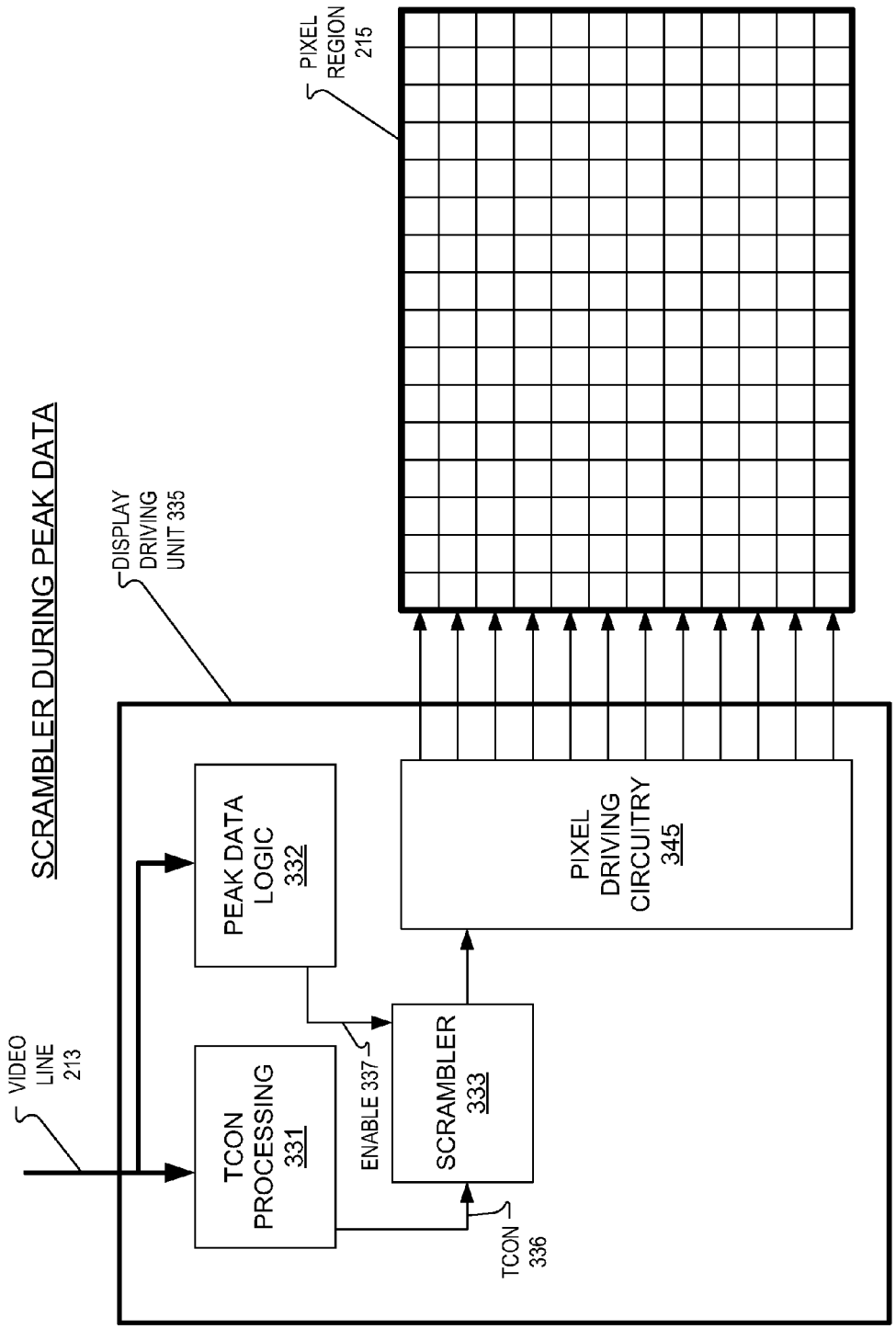
FIG. 3 illustrates an example display driving unit including peak data logic and a scrambler, in accordance with an embodiment of the disclosure.

FIG. 3 illustrates an example display driving unit 335 including peak data logic 332 and a scrambler 333, in accordance with an embodiment of the disclosure. Display driving unit 335 also includes TCON processing unit 331 and pixel driving circuitry 345. TCON processing unit 331 is coupled to receive image content from video line 213. Pixel driving circuitry 345 is coupled to selectively drive rows of pixel region 215, in FIG. 3. In other embodiments, pixel driving circuitry 345 is coupled to selectively drive columns of pixel region 215. In one embodiment, TCON processing unit 331, peak data logic 332, and scrambler 333 are disposed within a single integrated circuit. In one embodiment, TCON processing unit 331, peak data logic 332, and scrambler 333 are included in a micro-processor or FPGA.

In FIG. 3, peak data logic 332 is coupled to receive the image content from video line 213. In the illustrated embodiment, peak data logic 332 is configured to analyze the image content to determine whether there is (or will be) a peak data condition in processing the image content. One example of a peak data condition is when the hardware driving multi-panel display 250 is not capable of updating the display panels 201A-D at the desired frame rate when, for example, every pixel changes in the next scene and especially when the computation of this pixelated data is computationally complicated and time consuming. A peak data condition may occur when there is rapid change (e.g. a scene change) in overall-image displayed by multi-panel display 250. If peak data logic 332 determines there is a peak data condition, it will output an enable signal 337 to enable scrambling circuitry 333, which is coupled between TCON processing unit 331 and pixel driving circuitry 345. Scrambling circuitry 333 is coupled to receive enable signal 337 from peak data logic 332. In response to scrambling circuitry 333 receiving enable signal 337, it will cause the pixel rows of pixel region 215 (via pixel driving circuitry 345) to be driven in a non-sequential order. When scrambler 333 does not receive enable signal 337, it may cause pixel rows of pixel region 215 (via pixel driving circuitry 345) to be updated in a raster scanning algorithm, which updates the pixel rows sequentially, row-by-row.

In FIG. 3, peak data logic 332 is located on-board the display panel 201. However, it is appreciated that in some embodiments, peak data logic 332 may be located within CPU/GPU 203 and enable signal 337 may be sent over video line 213 as a digital or analog signal. In this alternative configuration, scrambling circuitry 333 may be coupled to video line 213 to receive the enable signal 337.

When scrambling circuitry 333 causes the pixels rows of pixel region 215 to be driven in a non-sequential order, it helps reduce or even eliminate a shearing image artifact that would be perceivable during a peak data condition if conventional raster scanning updated the pixel rows sequentially, row by row. In conventional raster scanning, the rows are updated sequentially (e.g. row 1, row 2, row 3, row 4 . . . ). Updating the pixel rows non-sequentially may reduce or eliminate a shearing image artifact perceived by a viewer, but at the same time, introducing spatial or temporal noise in the image. However, spatial or temporal noise (at certain frequencies) may be less noticeable or more pleasing to the eye of viewers when compared to shearing artifacts since images with shearing often include defined lines which the human eye detects easily. In one embodiment, updating the pixel rows in a non-sequential order may include updating pixel rows in a "snow pattern" that introduces pixel noise into the display image. In one embodiment the pixels rows are updated randomly.

Figure 4:
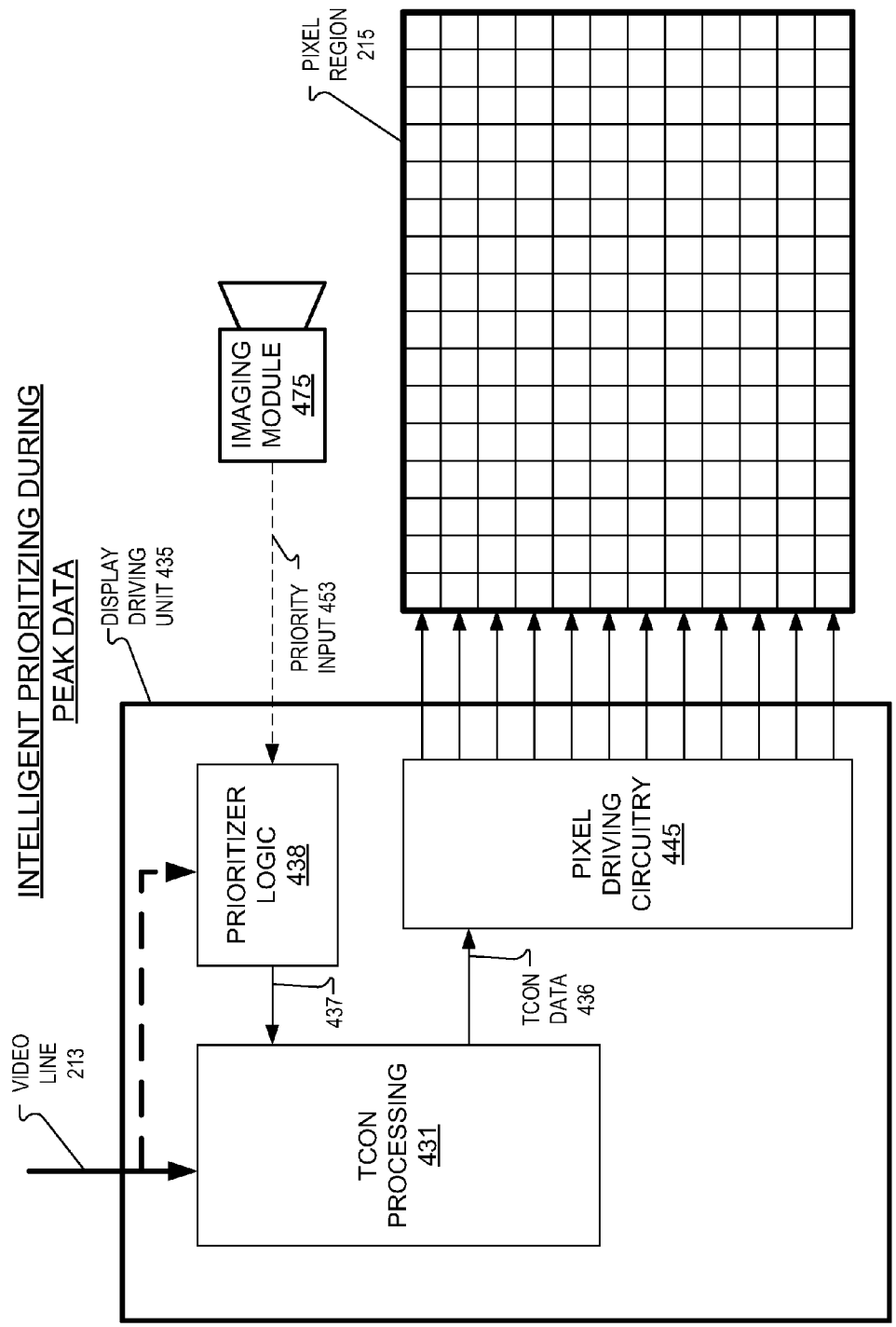
FIG. 4 illustrates an example display driving unit including prioritizer logic, in accordance with an embodiment of the disclosure.

FIG. 4 illustrates an example display driving unit 435 that includes prioritizer logic 438, in accordance with an embodiment of the disclosure. Display driving unit 435 also includes TCON processing unit 431 and pixel driving circuitry 445. TCON processing unit 431 is coupled to receive image content from video line 213. Pixel driving circuitry 445 is coupled to selectively drive rows of pixel region 215, in FIG. 4. In other embodiments, pixel driving circuitry 445 is coupled to selectively drive columns of pixel region 215. In one embodiment, TCON processing unit 431 and prioritizer logic 438 are disposed within a single integrated circuit. In one embodiment, TCON processing unit 431 and prioritizer logic 438 are included in a micro-processor or FPGA.

In FIG. 4, prioritizer logic 438 is coupled to receive imaging data (priority input 453) from imaging module 475. In embodiments where prioritizer logic 438 is coupled to receive imaging data from imaging module 475, prioritizer logic 438 is not necessarily coupled to receive image content from video line 213. When prioritizer logic 438 is coupled to video line 213, it may analyze the image content to identify a peak data condition. Alternatively, prioritizer logic 438 may receive a digital signal from video line 213 that a peak data condition has been identified by CPU/GPU 203.

Imaging module 475 may include a CMOS image sensor positioned to image viewers of pixel region 215 and/or multi-panel display 250. Prioritizer logic 438 may analyze the imaging data for eye-tracking information to identify visual zones of interest in the image content and correspond that visual zone of interest with a portion of pixel region 215. If a viewer is focusing or following a specific portion of the screen, prioritizer logic 438 may prioritize updating pixel rows that are displaying the portion of the pixel region 215 that corresponds with the visual zone of interest. As an example, a viewer or viewers of a sporting event may be consistently focusing on a ball or puck as it moves around the display(s). The imaging module may capture an image or a series of images of the viewer(s) and their eyes to allow prioritizer logic 438 to identify a visual zone of interest and prioritize updating pixel rows that correspond with that visual zone of interest. In a case with multiple viewers, prioritizer logic 438 may average the viewer's gaze in identifying the visual zone of interest. In one example, the prioritizer logic 438 prioritizes updating pixel rows corresponding to the last identified visual zone of interest on the assumption that the current visual zone of interest (where the viewer's eyes are looking) will be in the same portion of the pixel array as the last identified visual zone of interest.

In an embodiment where imaging module 475 is not included, prioritizer logic 438 receives the image content from video line 213 as input data. Prioritizer logic 438 may analyze the image content for pixel areas that include visual zones of interest. As an example, prioritizer logic 438 may perform contrast analysis of a frame in the image content. The contrast analysis may indicate focused portions of the frame, which would be visual zone(s) of interest. Prioritizer logic 438 can control TCON processing unit 431 (via priority signal 437) to prioritize generating the timing and control signals for the portions of the image that corresponds with the focused portions. TCON processing unit 431 then sends pixel driving circuitry 445 TCON data 436, which will cause pixel driving circuitry 445 to selectively update the rows of pixels that correspond with the focused portions of the frame. After the focused portions of the frame are updated, the unfocused portions of the frame may then be updated randomly, or not updated for that particular frame. Often times in films/movies, the camera focuses on a subject (e.g. a person's face) in the foreground, while the background is out of focus. In this case, prioritizing updating the pixel rows (or columns) that include the in-focus subject preserves the integrity of the portion of the image where artifacts would be most noticed by a viewer. Additionally, although the out-of-focus portion of the image may have pixel noise in it because those pixel rows were updated randomly (or perhaps not updated at all in some frames) the viewer is less likely to notice pixel noise in out-of-focus portions of the image.

Embodiments where some pixels (e.g. out-of-focus pixels) are not updated in every frame have the potential advantage of saving power because refreshing each pixel row at each refresh interval draws significant power.

In FIG. 4, prioritizer logic 438 is located on-board the display panel 201. However, it is appreciated that in some embodiments, prioritizer logic 438 may be located within CPU/GPU 203 and priority signal 437 may be sent over video line 213 as a digital signal or analog signal. In this alternative configuration, imaging module 475 may be coupled to provide priority input 453 to CPU/GPU 203. In embodiments where prioritizer logic 438 is located on-board CPU/GPU 203, CPU/GPU 203 may analyze image content from media 102 and only send TCON processing unit 431 data (over video line 213) for the pixels in pixel region 215 that are changing and need to be updated. This can dramatically reduce the power used by displays 201 to refresh pixel region 215. In addition, it reduces the amount of data needed to be sent over video lines 213, which reduces bottlenecking.

In some embodiments, media 102 may be accessible for pre-analysis of the image content to identify the visual zones of interest prior to actually rendering the content to the display. This may allow CPU/GPU 203 to compare frames in a video sequence to adjacent frames to identify the pixels that are actually changing. Then CPU/GPU 203 can only send data that corresponds with refreshing those pixels to TCON processing 431.

Figure 5:
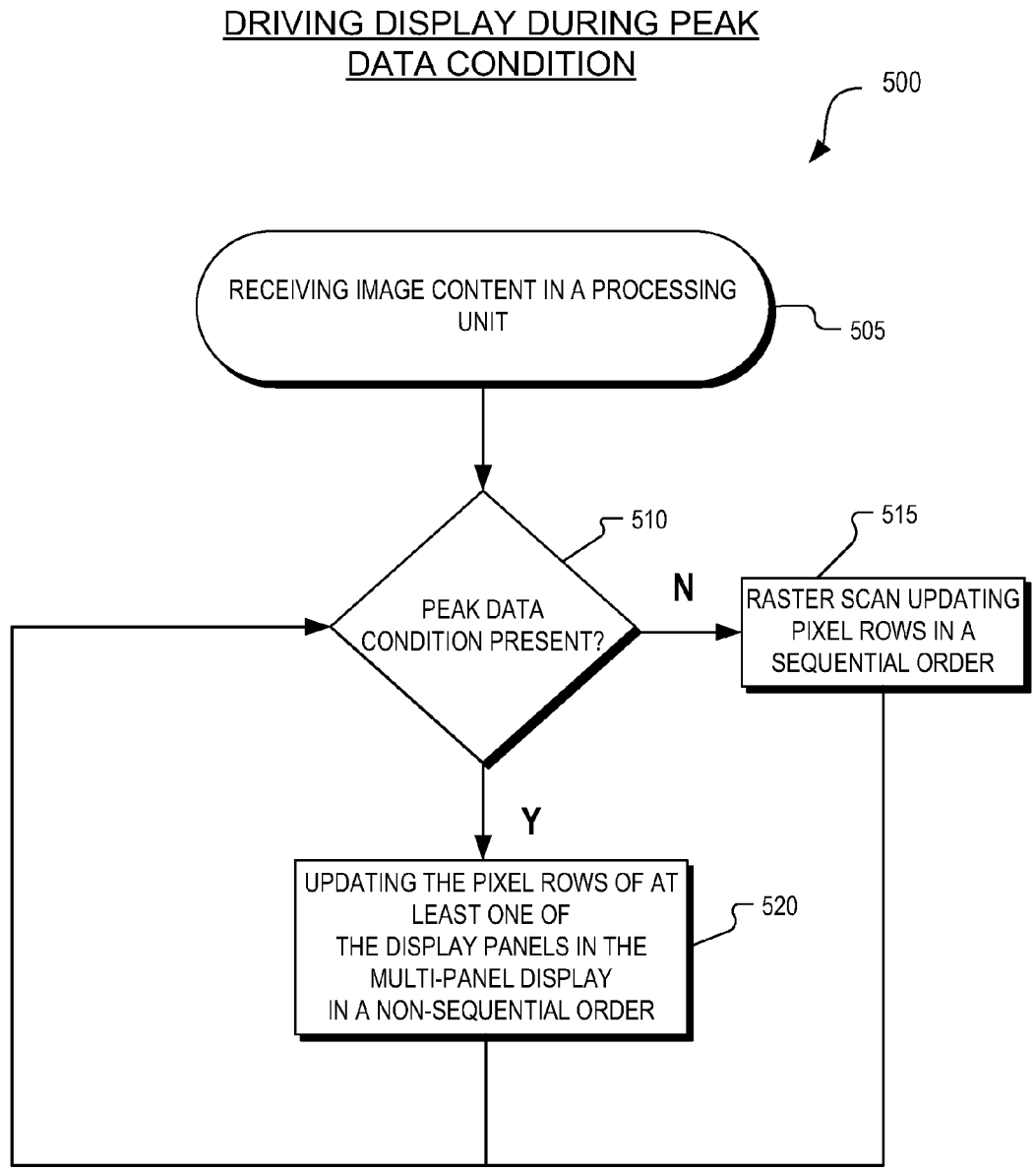
FIG. 5 illustrates a flow chart of a process of driving displays during a peak data condition, in accordance with an embodiment of the disclosure.

FIG. 5 illustrates a flow chart of a process 500 of driving displays during a peak data condition, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In process block 505, image content is received in a processing unit. In process block 510, a determination is made as to whether a peak data condition is present. The peak data condition may be identified or determined by CPU/GPU 203, peak data logic 332, or prioritizer logic 438, depending on the embodiment. If the peak data condition is not present, process 500 proceeds to process block 515 where pixel rows in a pixel region (e.g. pixel region 215) of at least one of the display panels in a multi-panel display are raster scan updated in a sequential order. After process block 515, process 500 returns to process block 510. If the peak data condition is present, process 500 proceeds to process block 520 where the pixel rows of at least one of the display panels in the multi-panel display is updated in a non-sequential order. In one embodiment, updating the pixel rows in a non-sequential order includes updating the pixel rows in a random order. After process block 520, process 500 returns to process block 510.

It is understood that although many of the embodiment are described in the context of being used with display panels arranged as a multi-panel display, the individual display panels may be sold individually to allow the buyer to decide how many panels will be part of her multi-panel display. It is appreciated that although the illustrated multi-panel display 250 is a 2×2 matrix of display panels 201, the embodiment of this disclosure can be applied to larger (e.g. 3×3 or 4×3 matrix of display panels 201) multi-panel displays. It is also appreciated that some embodiments may lend themselves to be used on individual display panels that are viewed as individual display panels rather than as multi-panel displays.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A multi-panel display system comprising:
an array of pixel regions, wherein each pixel region in the array includes pixels arranged in pixel rows and pixel columns;
peak data logic coupled to receive image content and configured to analyze the image content for a peak data condition in the image content and output an enable signal in response to the peak data condition; and
scrambling circuitry coupled to receive the enable signal from the peak data logic and coupled to cause the pixel rows to be driven in a non-sequential order scan in response to receiving the enable signal, wherein the pixel rows are refreshed in a sequential raster scan when the peak data condition is not present, wherein the scrambling circuitry is coupled to transition one or more of the pixel regions between the sequential raster scan and the non-sequential order scan in response to a change of the enable signal indicating a change in the peak data condition.

2. The multi-panel display system of claim 1, wherein the peak data logic is included in a display panel that includes at least one of the pixel regions.

3. The multi-panel display system of claim 1, further comprising a processing unit coupled to drive multiple display panels arranged as a multi-panel display, wherein the peak data logic is included in the processing unit and the processing unit is external to the display panels.

4. A multi-panel display system comprising:
an array of pixel regions, wherein each pixel region in the array includes pixels arranged in pixel rows and pixel columns;
peak data logic coupled to receive image content and configured to analyze the image content for a peak data condition in the image content and output an enable signal in response to the peak data condition;
scrambling circuitry coupled to receive the enable signal from the peak data logic and coupled to cause the pixel rows to be driven in a non-sequential order scan in response to receiving the enable signal, wherein the pixel rows are refreshed in a sequential raster scan when the peak data condition is not present;
timing and controller processing logic coupled to receive the image content; and
pixel driving circuitry coupled to drive the pixel regions, wherein the scrambling circuitry is coupled between the timing and controller processing logic and the pixel driving circuitry.

* * * * *